United States Patent
Serex

(10) Patent No.: US 6,534,742 B2
(45) Date of Patent: Mar. 18, 2003

(54) METHOD FOR ADJUSTING THE OSCILLATION FREQUENCY OF A SPRUNG BALANCE FOR A MECHANICAL TIMEPIECE

(75) Inventor: Florian Serex, Prêles (CH)

(73) Assignee: Eta SA Fabriques d'Ebauches (CH)

( * ) Notice: Subject to any disclaimer, the term of this patent is extended or adjusted under 35 U.S.C. 154(b) by 0 days.

(21) Appl. No.: 09/987,626

(22) Filed: Nov. 15, 2001

(65) Prior Publication Data

US 2002/0070203 A1 Jun. 13, 2002

(30) Foreign Application Priority Data

Dec. 7, 2000 (CH) .............................................. 2387/00

(51) Int. Cl.[7] .............................................. B23K 26/38
(52) U.S. Cl. .................................................. 219/121.69
(58) Field of Search ........................ 219/121.6, 121.68, 219/121.69, 121.72

(56) References Cited

U.S. PATENT DOCUMENTS 3,673,376 A   6/1972  Kullmann
3,766,616 A * 10/1973 Staudte
3,833,999 A *  9/1974 Budych et al.
4,259,563 A *  3/1981 Madeley

FOREIGN PATENT DOCUMENTS

CH          12 833/68 A4   10/1972

* cited by examiner

*Primary Examiner*—Samuel M. Heinrich
(74) *Attorney, Agent, or Firm*—Griffin & Szipl, P.C.

(57) ABSTRACT

In order to adjust the oscillation frequency of a sprung balance intended for or fitted to a mechanical timepiece, in a first step a balance spring is manufactured with a greater elastic torque than a reference torque corresponding to the oscillation frequency provided for the sprung balance. Once the sprung balance is assembled, the balance spring is machined by means of a laser beam to reduce its elastic torque until it substantially reaches the reference elastic torque. In particular, the laser machining consists in removing matter in order either to reduce the height of the balance spring in certain regions, or to reduce the thickness of the strip forming said balance spring. This invention allows conventional regulating means, in particular pins associated with an index, to be omitted. This enables working errors of the timepiece as a function of its position, to be avoided.

7 Claims, 4 Drawing Sheets

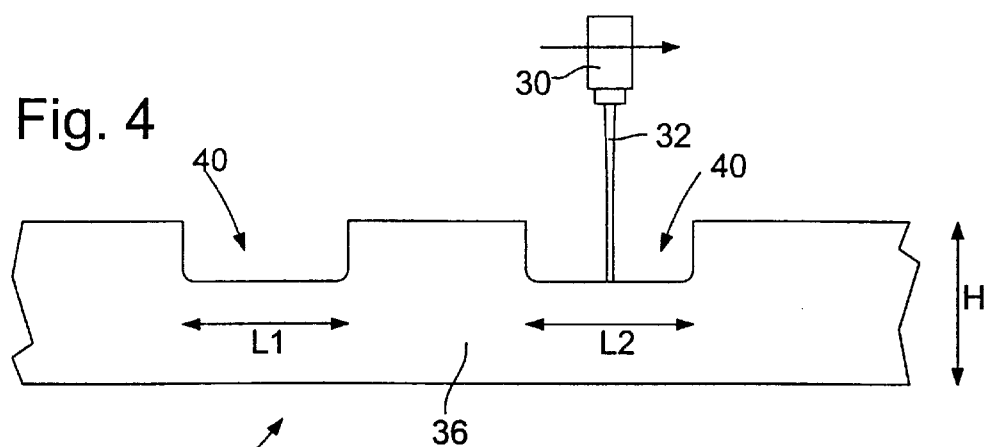
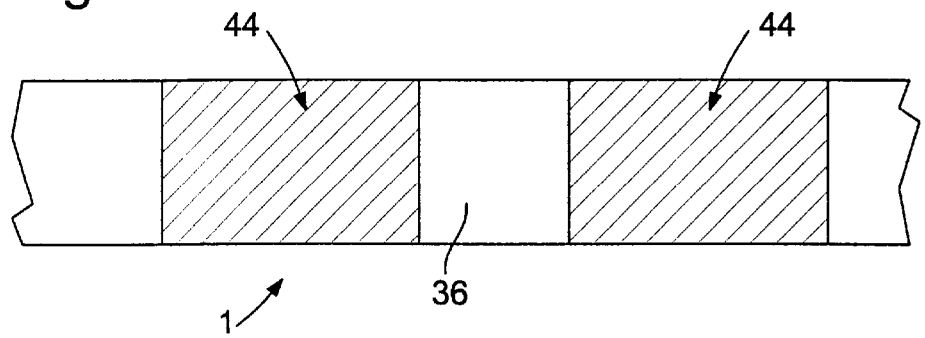
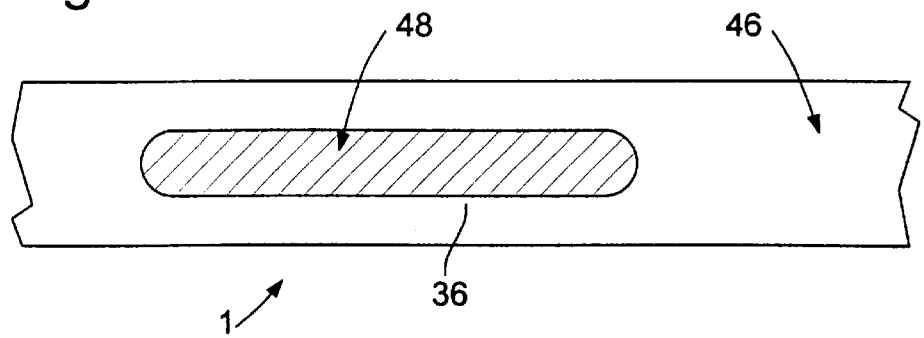
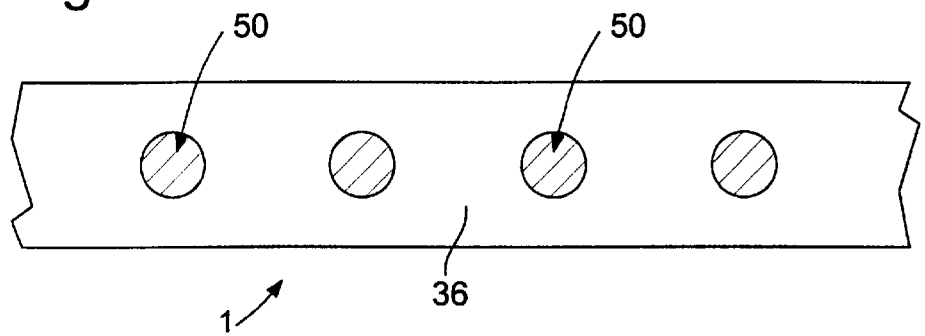

METHOD FOR ADJUSTING THE OSCILLATION FREQUENCY OF A SPRUNG BALANCE FOR A MECHANICAL TIMEPIECE

The present invention concerns a method for adjusting the oscillation frequency of a sprung balance fitted to a mechanical timepiece. The regulating assembly of a clockwork movement will be described briefly hereinafter with reference to annexed FIGS. 1 and 2. In a conventional manner, this regulating assembly includes a balance spring 1 associated with a balance 2. The balance spring is connected to the balance staff 4 by means of a collet 6. The outer end 8 of the balance spring is fixed to a balance-spring stud 10 secured to the balance cock 12. The oscillation of the sprung balance is maintained by the escapement wheel 14 meshed with the gear train of the movement.

In order to adjust the oscillation frequency of the sprung balance, two pins 16 and 17 are conventionally provided, fixed to an index or regulator 18 capable of being moved in rotation for example by means of an eccentric screw 20. Thus, by varying the position of the pins, the active length of the balance spring is varied. As the elastic torque of the balance spring is inversely proportional to the active length of the balance spring, the oscillation frequency of the sprung balance is substantially inversely proportional to the square root of this active length. Thus, in order to adjust the working frequency of the clockwork movement, a adjusting system comprising an index and pins between which the end portion 22 of the outer turn 24 of said balance spring 1, is generally provided in the prior art.

It will be noted that other adjusting systems exist, which act in particular on the moment of inertia of balance 2. All these means require the arrangement of a certain number of components intended for adjusting the oscillation frequency of the sprung balance.

Moreover, in the case shown in FIGS. 1 and 2, the adjustment of the two pins 16 and 17 is relatively difficult. It is often noted that depending on the position of the movement in space, the action of the pins is more or less efficient so that the active length of the balance spring varies according to said position. This is of course detrimental to the working of the timepiece and thus for the precision of the time or time interval displayed by the latter.

The object of the present invention consists in overcoming the aforementioned drawbacks by proposing an efficient, inexpensive method for adjusting the frequency of a sprung balance which allows the construction of the regulating assembly to be simplified.

The invention thus concerns a method for adjusting the oscillation frequency of a sprung balance in accordance with the steps mentioned in claim 1, during which laser machining of the balance spring is used to reduce the elastic torque of the latter until a reference elastic torque substantially corresponding to the reference frequency for the oscillation of the sprung balance is reached. It will be noted here that knowledge of the reference elastic torque is not necessary given that the adjustment can be performed in one or more successive steps by measuring the frequency of the assembled sprung balance. However, within the scope of the present invention, when ready to be assembled, the balance spring must have, for a given length between the fixing points to collet 6 and stud 10, a greater elastic torque than the aforementioned reference elastic torque. Indeed, the effect of the laser machining is to reduce the elastic torque of the spring, as will be explained hereinafter in more detail.

It will be noted that the oscillation frequency of the sprung balance may be adjusted during a preliminary step, preceding the assembly of the sprung balance in a clockwork movement. In a variant, pre-adjustment may be performed during this preliminary step and fine adjustment, also using a laser beam, is performed once the sprung balance is mounted in the clockwork movement to allow the oscillation frequency of the sprung balance to be precisely adjusted in a real operating situation and thus precise working of the clockwork movement to be assured.

As a result of the features of the present invention, no specific element for adjusting the oscillation frequency of the sprung balance is necessary. In particular, the regulating assembly preferably no longer includes any index pins. Thus, working variation problems depending on the position of the movement, due to the passing of the outer turn of the balance spring between the pins, are removed. It will be noted however that it is possible, in a particular embodiment, to fit the balance with fine adjusting means of its moment of inertia so as to allow subsequent adjustment after a certain period of operation of the clockwork movement. Indeed, the present invention is particularly suited to adjustment in a watchmaking factory or work shop and may prove complex for implementation by an after-sales service shop which performs conventional checks and necessary repairs following any damage caused to the timepiece.

The present invention will be described in more detail with reference to the annexed Figures, given by way of non-limiting example, and in which:

FIGS. 1 and 2, which have already been described, show a regulating assembly of the prior art fitted with an index with its two pins;

FIG. 4 shows schematically a laser machining mode of the balance spring within the scope of the method according to the invention; and FIGS. 5 to 7 show schematically three variants of another implementation of the method according to the invention.

Figure 1:
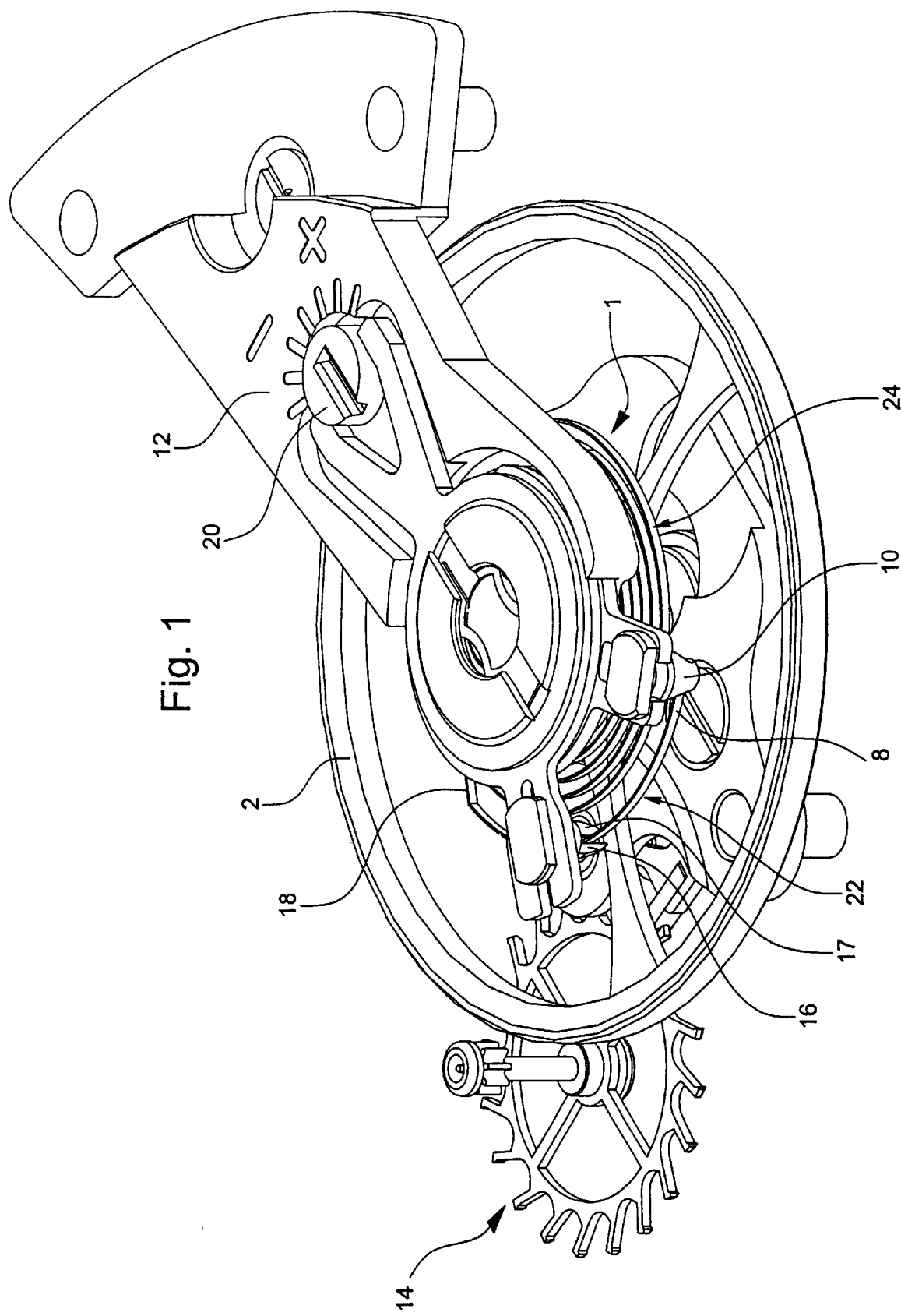
Figure 2:
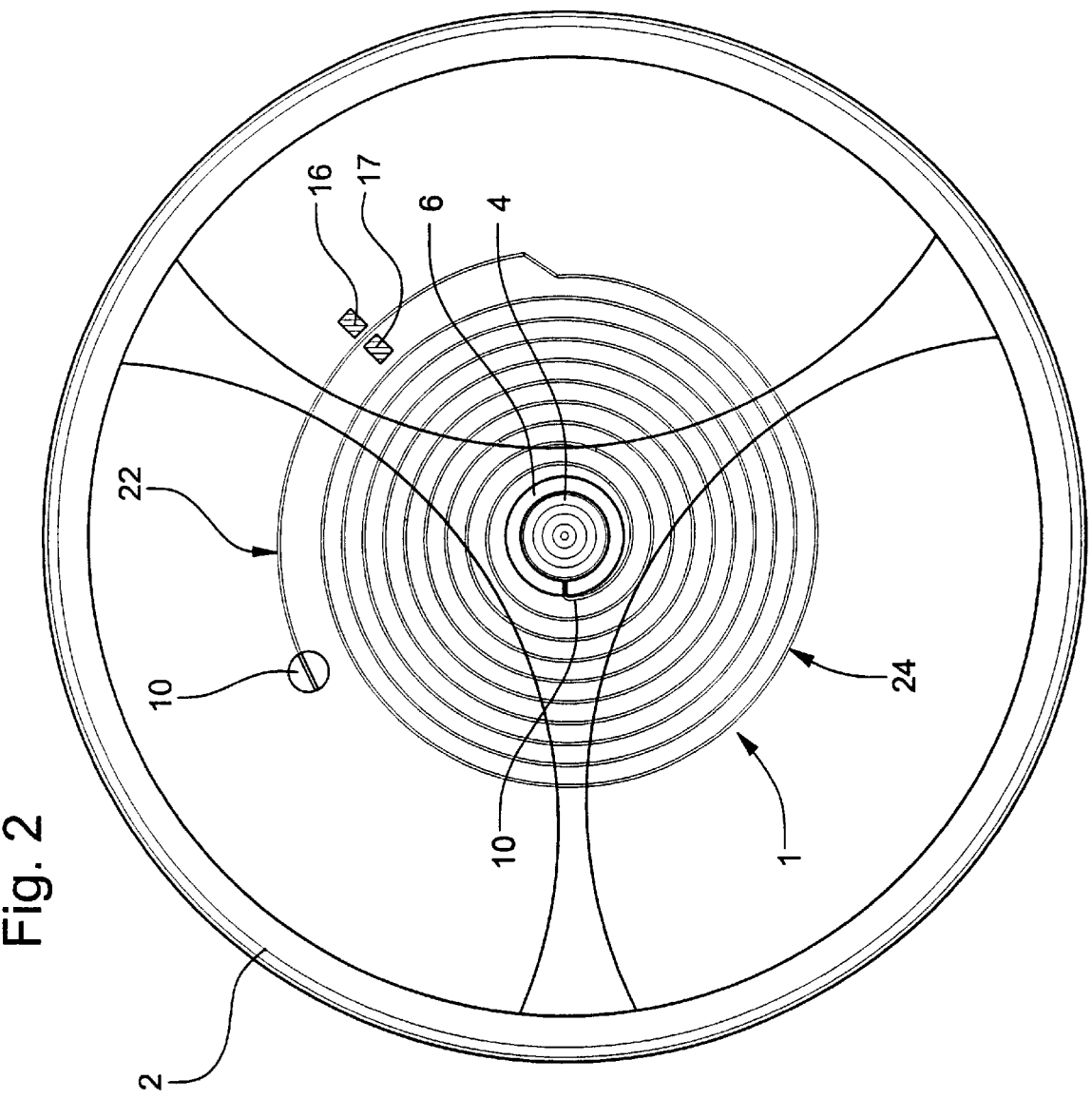
Figure 3:
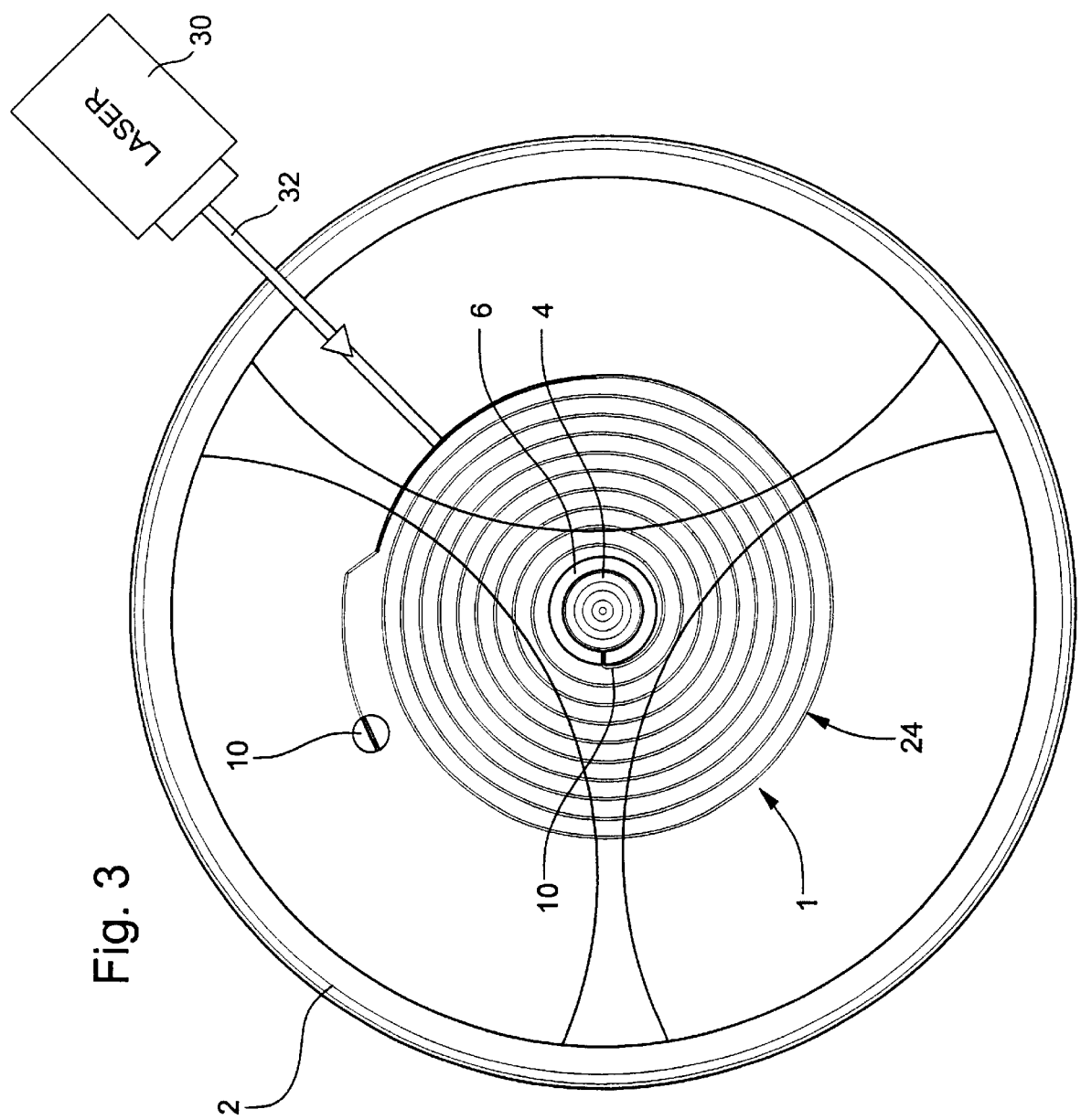
FIG. 3 is a simplified top view of a sprung balance according to the invention fixed to a stud.

With reference to FIG. 3, the method according to the invention will be described in general. Sprung balance 1, 2 is assembled and outer end 22 of the spring is fixed to a stud 10 of a clockwork movement (not shown). It will be noted that the assembly sprung balance may be mounted in a device specifically used for the method of the invention. In this latter case, replaced by equivalent fixing means.

According to the invention, the balance spring is manufactured with a greater elastic torque than a reference elastic torque corresponding to a reference frequency for the oscillation of the sprung balance.

Using means known to those skilled in the art, the oscillation frequency of the sprung balance is measured, this frequency then being higher than the reference frequency. In order to adjust this oscillation frequency and set it at least substantially to the reference frequency, according to the invention, a laser device 30 providing a laser beam 32 is used to machine or treat balance spring 1. Thus, within the scope of the present invention, the oscillation frequency of the regulating assembly is adjusted using neither index pins, nor using screws or small masses arranged on balance 2. However, as already mentioned, the present invention does not exclude the possibility of providing means for varying the inertia of the balance to allow fine adjustments after initial adjustment in the factory by means of the method according to the invention. According to this method, balance spring 1 is subjected to laser machining so as to reduce its elastic torque until it is substantially equal to the aforementioned reference elastic torque.

Within the scope of the method according to the invention, it is possible to provide at least two adjusting steps using the laser beam, namely a first step outside the timepiece allowing the oscillation frequency to be adjusted roughly, while assuring that it remains higher than the reference frequency. Then, in a second step occurring after the sprung balance has been mounted in the timepiece for which it is intended, the oscillation frequency is finely adjusted using laser device 30 as a function of one or more measurements of the oscillation frequency.

The control programme for laser device 30 and its relative movement with respect to the sprung balance may comprise a single machining or processing step as a function of an initial frequency measurement, using an algorithm established on the basis of an analytical or empirical model, or a combination of the two. In a more sophisticated variant, it is possible to provide a feed back loop, the processing or laser machining being performed via a succession of steps between which a measurement of said oscillation frequency is performed. In this case, the reference value can be approached quickly in few steps, for example one or two, and the fine adjustment can be finished by other subsequent steps in which the laser machining has only a low impact on the elastic torque of the balance spring. Thus, numerous variants are possible for controlling the laser device within the scope of the implementation of the method according to the invention.

In a first embodiment, the structure of balance spring 1 is modified at least superficially in at least one of its parts, in particular over a section of its outer turn 24, using laser beam 32. The function of such machining is first to vary the modulus of elasticity E of the balance spring by decreasing it to a value at which the elastic torque of the spring corresponds to the reference value. Indeed, as the oscillation frequency is proportional to the square root of the elastic torque M of the balance spring, and this torque is proportional to the modulus of elasticity E, a reduction in this module thus allows the oscillation frequency of the regulating assembly to be reduced. It will be noted that the laser machining can also be performed on several turns of the spring, along sections of variable size defined in particular as a function of access to these turns by the laser beam.

According to a second implementation mode of the method, shown schematically in FIG. 4, the height H of the strip 36 forming the balance spring is partially reduced. This reduction in height is provided only along sections L1, L2 of strip 36, which defines notches 40 along the upper or lower edge of this strip. These notches may vary in length and in number. As the elastic torque of balance spring 1 is proportional to the height of strip 36, an at least partial reduction of this height allows this torque to be reduced and thus the oscillation frequency of the sprung balance.

It will be noted here that the laser machining serves first of all to remove material and beam 32 is focused on the machining region of strip 36. According to a preferred variant, the laser is arranged so that beam 32 is substantially perpendicular to the general plane of the balance spring allowing either the top surface or the bottom surface of the balance spring to be machined. However, in another variant, device 30 is inclined such that laser beam 32 is oriented obliquely relative to strip 36. This latter variant allows a greater surface to be acted upon for the laser beam, but has the drawback that the laser beam can also reach the turn before the one being machined. This second implementation mode of the method easily allows several turns of the spring to be machined, in particular in the preferred variant.

According to a third implementation mode of the method shown in FIG. 5, the thickness of strip 36 forming spring 1 is reduced at least partially. This reduction in thickness in zones 44 is effected using a laser beam. This laser machining is preferably effected on turn 24 of the balance spring, but it is also possible to machine other turns by orienting the laser beam obliquely relative to the plane of the balance spring. In FIG. 5, zones 44 are through zones from top to bottom. The width of the zones may be variable, as can the number of machined zones provided. It is also possible to provide a succession of machining of lines made by paths along a vertical axis of the laser beam. The reduction in frequency arises from the fact that the elastic torque of the spring varies according to the cube of the thickness ($e^3$) of the strip forming the balance spring.

FIGS. 6 and 7 show two machining variants on the lateral face 46 of balance spring 1. In FIG. 6, zone 48 is oblong. This zone 48 forms a recess in strip 36 without reaching the top and bottom surfaces of the latter. Thus, the appearance of the balance spring seen from above has not been affected. In FIG. 7, zones 50 form a succession of circular recesses.

It will be noted finally that in the embodiments shown in FIGS. 6 and 7, it is possible for the laser machining to create through openings.

What is claimed is:

1. A method for adjusting the oscillation frequency of a regulating assembly intended for or fitted to a mechanical timepiece, wherein:

a balance spring is manufactured with a greater elastic torque than a reference elastic torque corresponding to a reference frequency for the oscillation of said regulating assembly;

a balance is assembled to said balance spring to form said regulating assembly; and said balance spring is machined by means of a laser beam so as to reduce its elastic torque until said oscillation frequency is substantially equal to said reference frequency.

2. An adjusting method according to claim 1, wherein said regulating assembly is mounted in said timepiece and that at least a final step of said laser machining of the balance spring is effected after such mounting, so as to adjust the elastic torque of said spring as well as possible to obtain said reference frequency for the oscillation of said regulating assembly during the working of said timepiece.

3. A method according to claim 1, wherein said laser beam is provided to be substantially perpendicular to the general plane of the balance spring, this laser beam being focused on parts of the top or bottom surface of said spring.

4. A method according to claim 1, wherein said laser beam is oriented so as to allow a lateral surface of said balance spring to be machined.

5. A method according to claim 3, wherein the laser machining causes removal of matter partially reducing the height of the strip forming the balance spring.

6. A method according to claim 4, wherein the laser machining causes removal of matter at least partially reducing the thickness of the strip forming the balance spring.

7. A method according to claim 1, wherein the laser machining reduces the elasticity module of said balance spring.

* * * * *